United States Patent [19]

Muramoto

[11] Patent Number: 5,075,781
[45] Date of Patent: Dec. 24, 1991

[54] IMAGE SIGNAL PROCESSING DEVICE WITH SKEW-COMPENSATION EFFECTED PRIOR TO SIGNAL COMPONENT SEPARATION

[75] Inventor: Tomotaka Muramoto, Tokyo, Japan

[73] Assignee: Canon Kabushiki Kaisha, Tokyo, Japan

[21] Appl. No.: 359,156

[22] Filed: May 31, 1989

[30] Foreign Application Priority Data

Jun. 10, 1988 [JP] Japan .................. 63-143084

[51] Int. Cl.⁵ ............................. H04N 5/782
[52] U.S. Cl. ................... 358/337; 358/320; 360/76; 360/36.1
[58] Field of Search ............... 360/26, 76, 36.1, 33.1, 360/35.1; 358/337, 320, 321

[56] References Cited

U.S. PATENT DOCUMENTS 4,750,054 6/1988 Hickok ........................ 358/337

Primary Examiner—Robert L. Richardson
Attorney, Agent, or Firm—Robin, Blecker, Daley & Driscoll

[57] ABSTRACT

A device for processing a recorded signal obtained by frequency-multiplexing one field portion of an image signal with an information signal related to the image signal performs skew compensation at a processing juncture preceding separation of the multiplexed signals. In a preferred practice, multiplexed color-difference line-sequential and information signal components of an image signal and are skew-compensated in multiplexed form and then separated into respective individual signals.

3 Claims, 4 Drawing Sheets

IMAGE SIGNAL PROCESSING DEVICE WITH SKEW-COMPENSATION EFFECTED PRIOR TO SIGNAL COMPONENT SEPARATION

BACKGROUND OF THE INVENTION

1. Field of the Invention

This invention relates to an image signal processing device for processing an image signal.

2. Description of the Related Art

The conventional image signal processing apparatuses include an electronic still video camera system.

In the electronic still video camera system, a video camera part is arranged to form an image signal corresponding to the image of an object to be photographed. The image signal is recorded on a recording medium such as a magnetic disc or the like. The image signal recorded on the recording medium is reproduced to have an image corresponding to the image signal either displayed on a monitor device or printed by a printer.

The recording device of the electronic still video camera system separates one field portion of the image signal obtained by the video camera part into a luminance signal and a chrominance signal. The luminance signal is frequency-modulated into a frequency-modulated luminance signal. The chrominance signal is frequency-modulated into a frequency-modulated color-difference line-sequential signal after being converted into a color-difference line-sequential signal as well known. The frequency-modulated luminance signal and the frequency-modulated color-difference line-sequential signal are frequency-multiplexed to form a recording signal. The recording signal thus obtained is recorded in one recording track on the recording medium. Further, in recording one frame portion of the image signal on the recording medium, two field portions of the recording signal corresponding to two field portions of the image signal which jointly form one frame portion of the image signal are recorded in two recording tracks on the recording medium.

There is provided an index signal (hereinafter referred to as ID signal for short) for indicating the image recording date including the year, month and day or recording time including the hour, minute and second, or the like. The ID signal is frequency-multiplexed with the recording signal. Further, the ID signal is formed, as well known, by DPSK (differential phase shift keying) modulating a given single frequency signal of a frequency 13fH (fH: horizontal scanning frequency) with digital data which indicates the above-stated recording date or recording time or the like.

The frequency spectrum of the recording signal recorded on the recording medium in the above-stated manner is shown in FIG. 2 of the accompanying drawings. In FIG. 2, a reference numeral 31 denotes the ID signal; 32 denotes the frequency-modulated color-difference line-sequential signal; and 33 the frequency-modulated luminance signal.

FIG. 1 shows in outline the arrangement of a reproducing device included in the electronic still video camera system. Referring to FIG. 1, a magnetic disc 2 is arranged to be rotated by a motor 1 at a given rotation cycle. With the disc 2 thus rotated, a signal recorded is reproduced from the disc 2 by a magnetic head 3. The reproduced signal is amplified by a pre-amplifier 4. After that, the frequency-modulated luminance signal is separated by a high-pass filter (HPF) 5. The frequency-modulated color-difference line-sequential signal is separated by a band-pass filter (BPF) 6. Further, the ID signal is separated by another BPF 7.

The frequency-modulated luminance signal which has been separated by the HPI 5 is supplied to an equalizer 8 to have its frequency characteristic corrected. A luminance signal frequency demodulation circuit 9 frequency-demodulates the frequency-modulated luminance signal to a baseband luminance signal.

The baseband luminance signal which has been output from the luminance signal frequency demodulation circuit 9 is supplied to a drop-out compensation circuit 10 to be compensated for its drop-out part generated during the process of reproduction. The drop-out-compensated luminance signal is supplied both to a skew compensation circuit 11 and a synchronizing signal separation circuit 12.

The synchronizing (hereinafter referred to as sync for short) signal separation circuit 12 separates horizontal and vertical sync signals from the baseband luminance signal output from the drop-out compensation circuit 10. These sync signals are supplied both to a DPSK demodulation circuit 13 and a sync signal generating circuit 14. The horizontal and vertical sync signals separated by the sync signal separation circuit 12 have a skew, as well known, in a field reproduction mode, in which the signal recorded in one recording track on the magnetic disc 2 is repeatedly reproduced. The sync signal generating circuit 14 is arranged to generate sync signals of varied kinds in synchronism with the horizontal and vertical sync signals separated by the sync signal separation circuit 12.

The baseband luminance signal which has been supplied from the drop-out compensation circuit 10 to the skew compensation circuit 11 is compensated for a skew occurring in the baseband luminance signal in the field reproduction mode as mentioned above. The skew compensation circuit 11 thus performs skew compensation in such a way as to keep the continuity of the horizontal sync signal added to the baseband luminance signal. After passing through the skew compensation circuit 11, the luminance signal is supplied both to a character signal addition circuit 15 and a sync signal separation circuit 16.

The sync signal separation circuit 16 is arranged to separate the horizontal and vertical sync signals from the baseband luminance signal which has been skew compensated by the skew compensation circuit 11. The horizontal and vertical sync signals separated by the sync signal separation circuit 16 are supplied to a character signal generating circuit 17. The character signal generating circuit 17 is arranged to generate a character signal according to the contents of the ID signal which has been supplied from the DPSK demodulation circuit 13 as will be further described later on. The character signal generated by the character signal generating circuit 17 is supplied to the above-stated character signal addition circuit 15. The character signal addition circuit 15 is arranged to add the character signal generated by the character signal generating circuit 17 to the skew-compensated baseband luminance signal output from the skew compensation circuit 11. The output of the character signal addition circuit 15 is supplied both to a multiplex circuit 18 and an output terminal 19.

Meanwhile, the frequency-modulated color-difference line-sequential signal which has been extracted by the BPF 6 is supplied to an equalizer 20 for correction of its frequency characteristic. After that, the color-difference line-sequential signal is frequency-demodulated by a color-difference line-sequential signal frequency demodulation circuit 21 into a baseband color-difference line-sequential signal. The baseband color-difference line-sequential signal output from the color-difference line-sequential signal frequency demodulator circuit 21 is supplied to a skew compensation circuit 22 to be compensated for a skew occurred therein during the process of field reproduction. The skew-compensated color-difference line-sequential signal is then supplied to a simultaneous conversion circuit 23 to undergo a simultaneous converting process. As a result, the simultaneous conversion circuit 23 outputs two color-difference signals R-Y and B-Y and supplies them to a quadrature two-phase modulation circuit 24. The quadrature two-phase modulation circuit 24 then quadrature two-phase modulates the inputs into a carrier chrominance signal.

The carrier chrominance signal output from the quadrature two-phase modulation circuit 24 is supplied to a mute circuit 25. At the mute circuit 25, the carrier chrominance signal is muted during a period of time for which the character signal is added to the luminance signal by the character signal addition circuit 15 as mentioned above. The period of time for which the carrier chrominance signal is muted by the mute circuit 25 is controlled by a control signal supplied from the character signal generating circuit 17.

The carrier chrominance signal which has been muted by the mute circuit 25 during a period of time for which the character signal is added to the luminance signal is output not only from an output terminal 26 but also from another output terminal 27 as a television signal with the carrier chrominance signal frequency-multiplexed by the multiplex circuit 18 with the luminance signal to which the above-stated character signal has been added.

The DPSK-modulated ID signal which has been extracted by the BPF 7 is demodulated by a DPSK demodulation circuit 13 in synchronism with the horizontal and vertical sync signals which have been separated from the sync signal separation circuit 12 and which have not been skew compensated as yet. The demodulated ID signal is supplied to the character signal generating circuit 17. Upon receipt of the ID signal, the character signal generating circuit 17 generates, according to the content of the ID signal, a character signal which represents a character, a digit or a symbol as applicable.

However, the reproducing device arranged as shown in FIG. 1 has presented the following problem: During the field reproduction, at the skew compensation circuit 22 which skew-compensates for the color-difference line-sequential signal, there arises a discrepancy in level or hue between the color-difference line-sequential signal and a color-difference line-sequential signal which has been delayed for ½ horizontal synchronizing period for the purpose of using it for the skew compensation. This results in flickering or a color deviation of a reproduced image obtained though the skew compensation. Further, the device necessitates, as shown in FIG. 1, use of the horizontal and vertical sync signals for DPSK-demodulating the ID signal before the skew compensation thereof and thus necessitates the use of sync signal separation circuits in two channels. This not only requires a complicated circuit arrangement but also tends to result in a moire or the like caused by the generation of a cross-talk component between the sync signals on the reproduced picture plane as the sync signals separated by the sync signal separation circuits of different channels differ from each other.

SUMMARY OF THE INVENTION

It is a general object of this invention to provide an image signal processing device which is capable of solving the above-stated problems of the prior art.

It is a more specific object of the invention to provide an image signal processing device which is capable of demodulating, without deterioration, an image signal modulated according to a given modulation method.

Under this object, an image signal processing device arranged, according to the invention in one mode of embodiment thereof, to process a modulated image signal modulated by a given modulation method, comprises: delay means, arranged to input the modulated image signal, for delaying the input modulated image signal for a first period of time to output the delayed modulated image signal; output means for alternately outputting, for every second period, the modulated image signal delayed by the delay means and the modulated image signal not delayed by the delay means; and demodulation means for demodulating the modulated image signal output from the output means to output an image signal.

It is another object of the invention to provide an image signal processing device which is of simple arrangement.

Under that object, an image signal processing device arranged, according to the invention in another mode of embodiment thereof, to handle a recording medium on which a frequency multiplex signal obtained by frequency-multiplexing one field portion of an image signal and an information signal corresponding to the image signal has been recorded, comprises: reproducing means for continuously reproducing the frequency multiplex signal from the recording medium; skew compensating means for skew-compensating the frequency multiplex signal reproduced by the reproducing means to output the skew-compensated frequency multiplex signal; information signal separating means for separating the information signal from the frequency multiplex signal output from the skew compensating means; and image signal separating means for separating the image signal from the frequency multiplex signal output from the skew compensating means.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
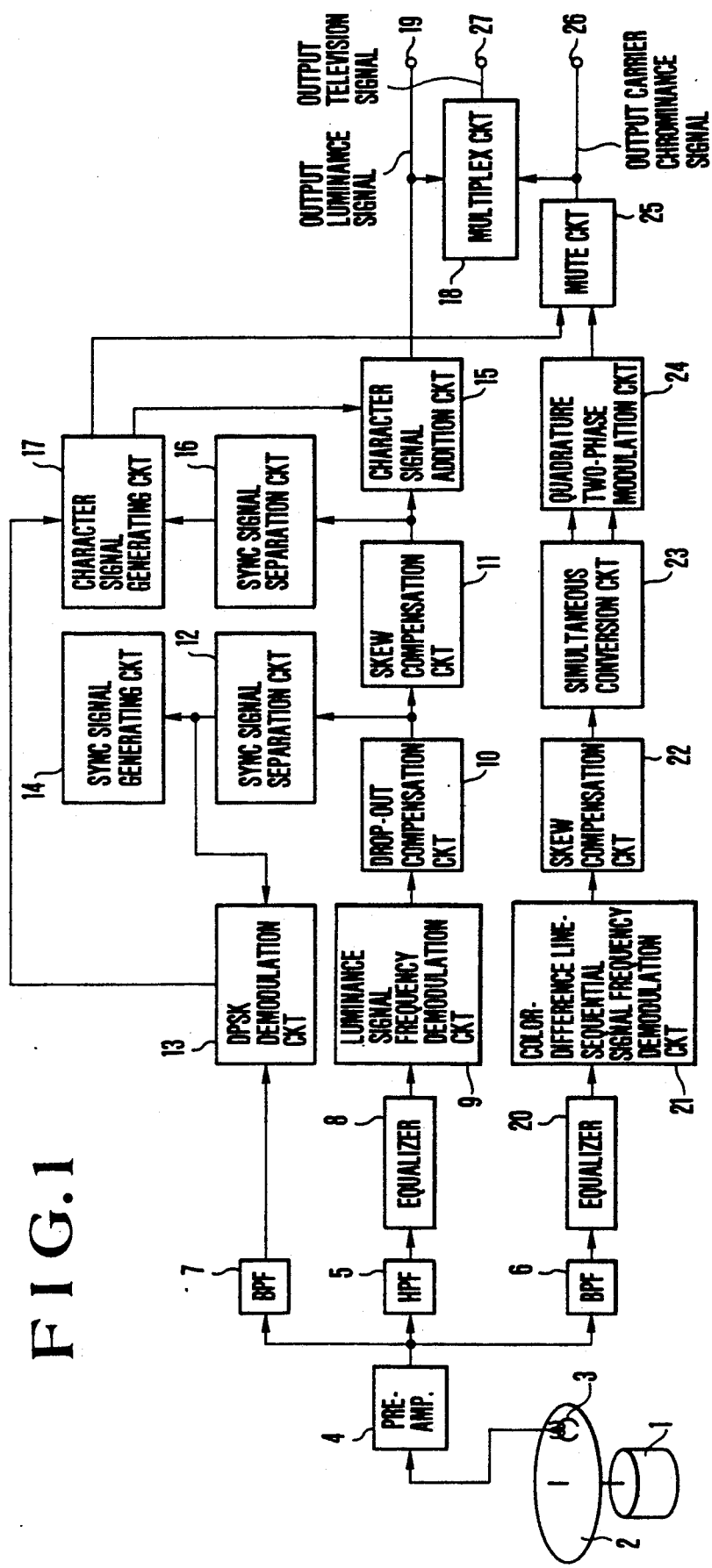
FIG. 1 is a block diagram showing the conventional reproducing device included in an electronic still video camera system.
Figure 2:
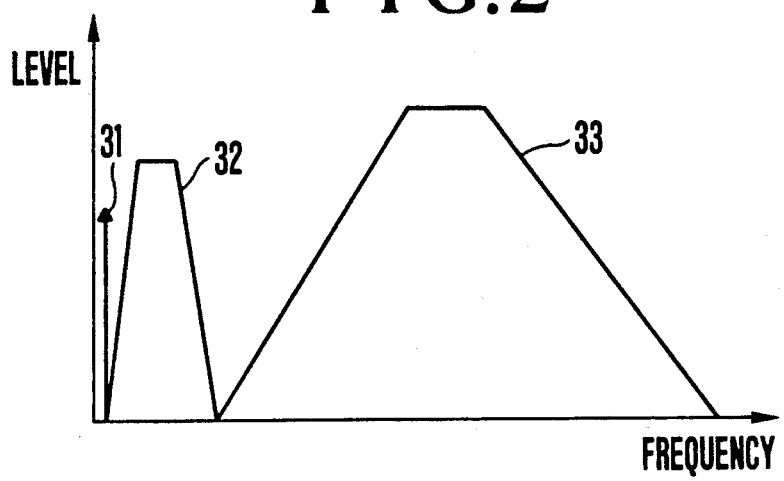
FIG. 2 shows the frequency spectrum of a recording signal recorded on a recording medium to be used by the electronic still video camera system.
Figure 3:
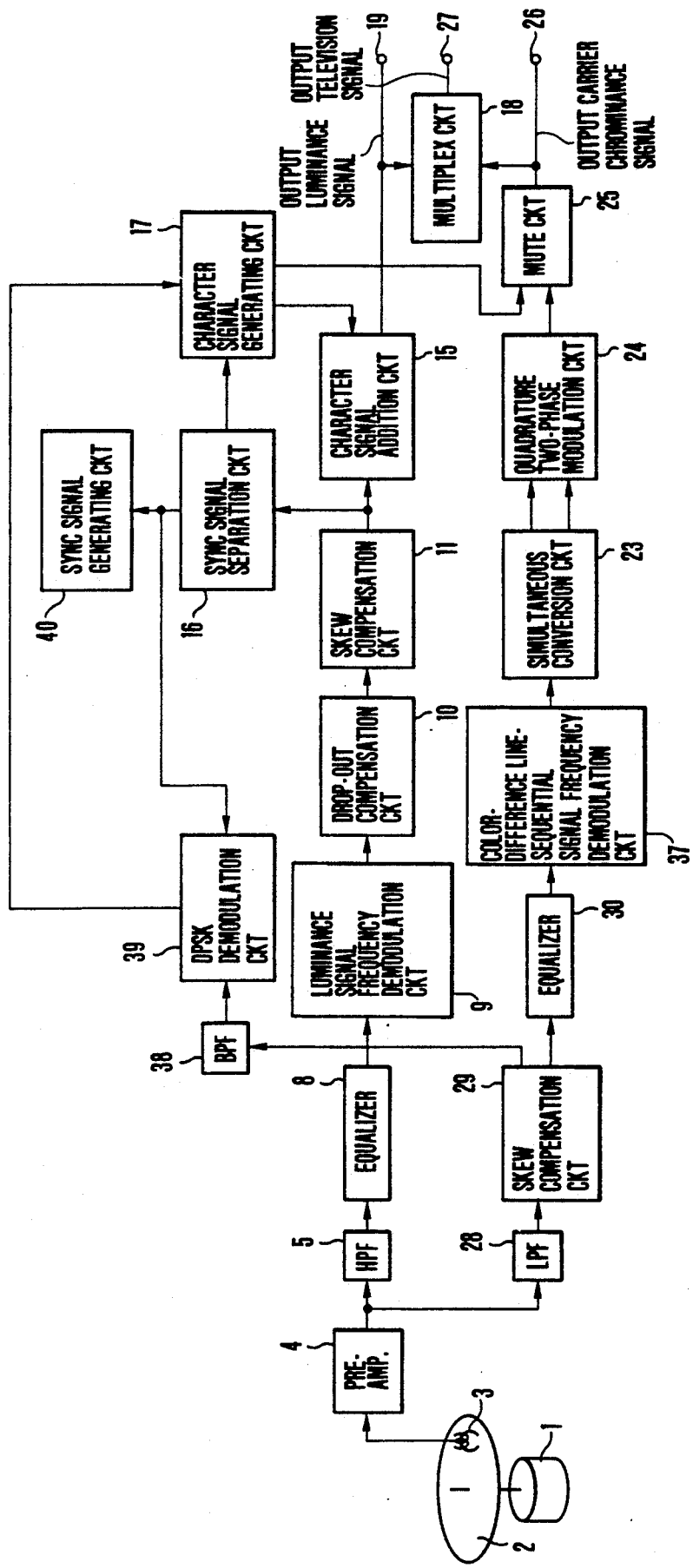
FIG. 3 is a block diagram showing in outline the arrangement of a reproducing device included in an electronic still video camera system to which this invention is applied as an embodiment thereof.

The following describes the details of this invention through embodiments thereof:

FIG. 3 shows in outline the arrangement of a reproducing device as an embodiment of the invention. In FIG. 3, the same component parts as those of FIG. 1 are indicated by the same reference numerals and the details of them are omitted from description.

Figure 4:
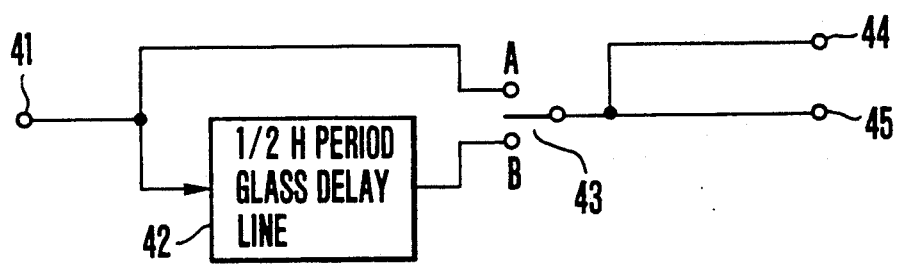
FIG. 4 is a circuit diagram showing by way of example the arrangement of a skew compensation circuit 29 included in the reproducing device of FIG. 3.
Figure 6A:
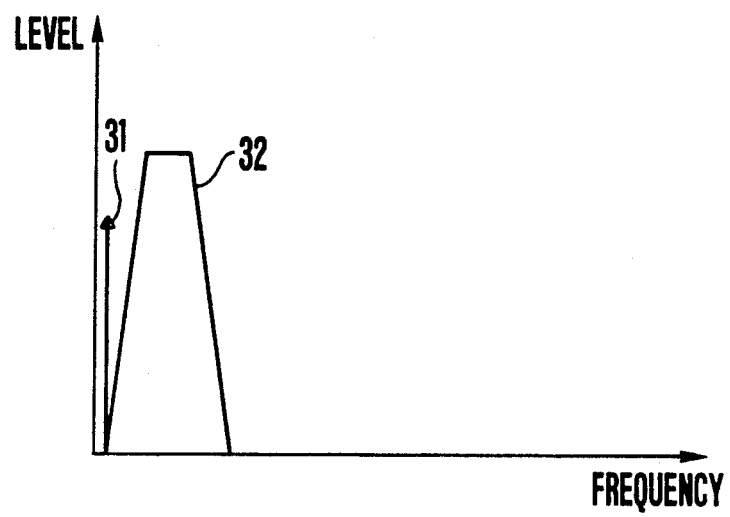
FIG. 6a shows the frequency spectrum of a signal output from a low-pass filter shown in FIG. 3.

Referring to FIG. 3, in the field reproducing mode, a signal reproduced from a magnetic disc 2 by the magnetic head 3 is amplified by the pre-amplifier 4. After that, a low-pass filter (LPF) 28 separates from the reproduced signal a frequency-modulated color-difference line-sequential signal 32 which has a frequency spectrum as shown in FIG. 6a and an ID signal 31 which has been DPSK-modulated. The output of the LPF 28 is supplied to a skew compensation circuit 29. The skew compensation circuit 29 is arranged as shown in FIG. 4. Referring to FIG. 4, the signal output from the LPF 28 is input by an input terminal 41 and is then divided into two channels. The signal of one channel is supplied to one input terminal B of a switch 43 via a glass delay line 42 which delays the input for a period of ½ H (H: a horizontal scanning period). The signal of the other channel is supplied directly to another input terminal A of the switch 43.

The switch 43 is arranged to alternately shift its connecting position between one side A and the other side B thereof for every field period. With the switch 43 operating in this manner, from output terminals 44 and 45 the frequency-modulated color-difference line-sequential signal and the DPSK-modulated ID signal with both of them skew compensated are output. The signal output from the output terminal 44 of the skew compensation circuit 29 is supplied to a BPF 38, and the signal output from the other output terminal 45 is supplied to an equalizer 30.

The BPF 38 separates the DPSK-modulated ID signal from the signal output from the skew compensation circuit 29. The DPSK-modulated ID signal output from the BPF 38 is supplied to a DPSK demodulation circuit 39. The DPSK demodulation circuit 39 receives also skew-compensated horizontal and vertical sync signals which have been separated by a sync signal separation circuit 16. The DPSK-modulated ID signal which has been skew-compensated and output from the BPF 38 is demodulated in synchronism with the sync signals. The demodulated ID signal is supplied to a character signal generating circuit 17. The character signal generating circuit 17 then generates a character signal representing a character, a digit or a symbol according to the contents of the ID signal.

The equalizer 30 performs a frequency characteristic correcting action on the input frequency multiplex signal consisting of the frequency-modulated color-difference line-sequential signal which has been skew-compensated and the ID signal which has been DPSK-modulated. The output of the equalizer 30 is supplied to a color-difference line-sequential signal frequency demodulation circuit 37 to be demodulated into a baseband color-differential line-sequential signal and is then supplied to a simultaneous conversion circuit 23. As a result, the simultaneous conversion circuit 23 forms and outputs two color-difference signals R-Y and B-Y. Further, the skew-compensated horizontal and vertical sync signals which have been separated by the above-stated sync signal separation circuit 16 are supplied to a sync signal generating circuit 40. The sync signal generating circuit 40 forms and outputs sync signals of varied kinds in synchronism with the horizontal and vertical sync signals.

The ensuing processing actions are performed in the same manner as in the case of the conventional reproducing device shown in FIG. 1. To the signal reproduced from the magnetic disc 2 is added the character signal corresponding to the contents of the ID signal. The signals are output from the output terminals 19, 26 and 27 in the same manner as in the case of FIG. 1.

As described above a multiplex signal which consists of the frequency modulated color-difference line-sequential signal and the DPSK-modulated ID signal and which has been separated from the signal reproduced from the magnetic disc 2 is skew-compensated and, after that, is DPSK-demodulated. Such being the arrangement, the invented device requires only one sync signal separation circuit. This feature permits not only simplification of the circuit arrangement but also eliminates the possibility of occurrence of the cross-talk components of the sync signals.

Figure 5:
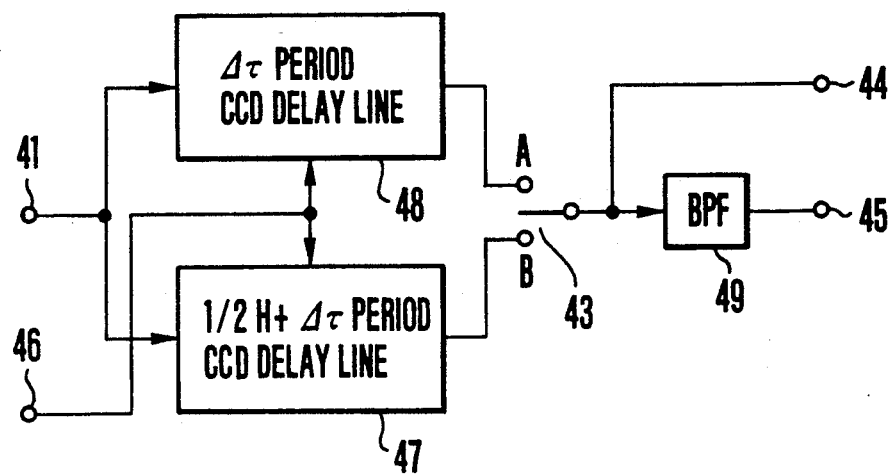
FIG. 5 is a circuit diagram showing another example of the arrangement of the skew compensation circuit 29 of the reproducing device of FIG. 3.
Figure 6B:
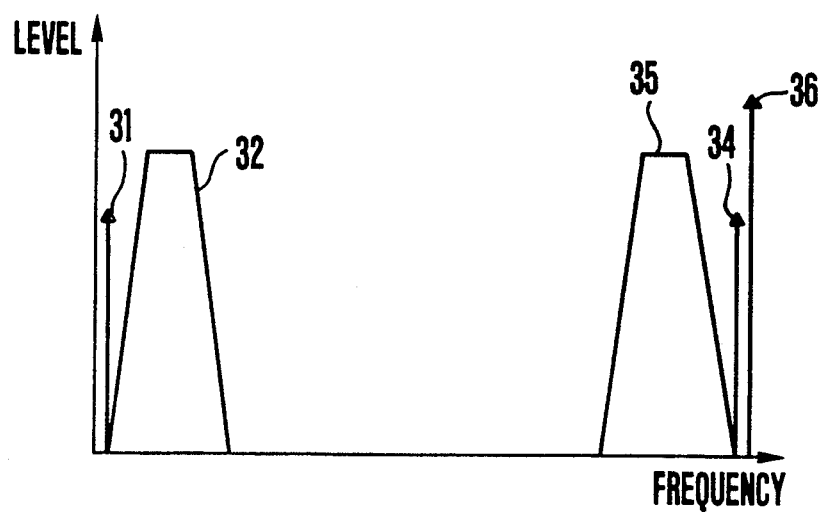
FIG. 6b shows the frequency spectrum of a signal output from a CCD delay line shown in FIG. 5.

FIG. 5 shows another example of the arrangement of the skew compensation circuit 29 of FIG. 3 as another embodiment of this invention. In the case of that embodiment, a CCD (charge-coupled device) is employed as a delay line. The embodiment operates as follows:

The signal output from the LPF 28 is supplied to an input terminal 41 and is divided into two channels. The signal of one channel is supplied to an input terminal B of a switch 43 via a CCD delay line 47 which delays it for a period of ½ H+$\Delta\tau$. The signal of the other channel is supplied to the input terminal A of the switch 43 via another CCD delay line 48 which delays it for a period of $\Delta\tau$. The delay time $\Delta\tau$ is a very short time provided for obtaining a signal output time difference of ½ H between the delay lines 47 and 48. The delay lines 47 and 48 are driven by a clock signal of, for example, 10.7 MHz input by an input terminal 46. The frequency spectra of the signals output from the delay lines 47 and 48 are as shown in FIG. 6b. As shown, in addition to the original signal, there arise components 34 and 35 as a result of aliasing at the frequency 36 of the clock signal. This is because, with the delay lines 47 and 48 used, sample-and-holding actions are performed at the CCD delay lines 47 and 48 in synchronism with the clock signal 36.

The switch 43 is operated to shift its connecting positions alternately between its two sides A and B for every field period. As a result, the switch 43 outputs the frequency-modulated color-difference line-sequential signal and the DPSK-modulated ID signal with both of them skew-compensated. These signals are supplied via an output terminal 44 to the BPF 38 as well as to a BPF 49. The BPF 49 is a filter arranged to separate only the frequency-modulated color-difference line-sequential signal 35 which is as shown in FIG. 6b. The frequency-modulated color-difference line-sequential signal is supplied via an output terminal 45 to the equalizer 30. The frequency characteristic of the color-difference line-sequential signal is corrected by the equalizer 30. The output of the equalizer 30 is frequency-demodulated by the color-difference line-sequential signal frequency demodulation circuit 37.

The use of the CCD delay lines for skew compensation in the above-stated manner enables the embodiment to convert the frequency-modulated color-difference line-sequential signal from a frequency band 32 to another frequency band 35 as shown in FIG. 6b without having recourse to any additional arrangement for the frequency conversion. Therefore, a carrier leak which takes place during the process of frequency demodulation can be held to a minimal degree, so that the picture quality attainable in the field reproducing mode can be enhanced.

While the invention is applied to the reproducing device of an electronic still video camera system in the case of this embodiment, the invention is not limited to the system of this kind but is applicable also to other systems that are arranged to perform field reproduction, such as a VTR, a video disc player, etc.

As described in the foregoing, an image signal processing device according to this invention not only can be arranged simpler than the conventional device but is capable of processing image signals without causing any flicker, color deviation or moire.

What is claimed is:

1. An image signal processing device for use with a recording medium bearing a frequency multiplex signal obtained by frequency multiplexing one field portion of an image signal and an information signal related to the image signal, comprising:

a) reproducing means for reproducing the frequency multiplex signal from the recording medium;
   b) skew compensating means for skew-compensating the frequency multiplex signal to output a skew-compensated frequency multiplex signal;
   c) information signal separating means for separating the information signal from the skew-compensated frequency multiplex signal output from said skew compensating means; and
   d) image signal separating means for separating the image signal from the skew-compensated frequency multiplex signal output from said skew compensating means.

2. A device according to claim 1, wherein the image signal includes a horizontal synchronizing signal, and wherein the information signal includes a signal component which has been modulated in synchronism with said horizontal synchronization signal.

3. A device according to claim 2, further comprising:
   synchronizing signal separating means for separating the horizontal synchronizing signal from the skew-compensated frequency multiplex signal output from said skew compensating means; and
   2) demodulation means receiving the information signal separated from said information signal separating means and the horizontal synchronizing signal separated by said synchronizing signal separating means for demodulating the received information signal in synchronism with the received horizontal synchronizing signal.

* * * * *